(12) United States Patent
Ingalls et al.

(10) Patent No.: US 11,847,060 B2
(45) Date of Patent: *Dec. 19, 2023

(54) DATA CACHE WITH PREDICTION HINTS FOR CACHE HITS

(71) Applicant: SiFive, Inc., San Mateo, CA (US)

(72) Inventors: John Ingalls, Sunnyvale, CA (US); Josh Smith, San Francisco, CA (US)

(73) Assignee: SiFive, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/115,959

(22) Filed: Mar. 1, 2023

(65) Prior Publication Data

US 2023/0205703 A1 Jun. 29, 2023

Related U.S. Application Data

(63) Continuation of application No. 16/797,476, filed on Feb. 21, 2020, now Pat. No. 11,620,229.

(51) Int. Cl.
*G06F 12/0888* (2016.01)
*G06F 12/0862* (2016.01)

(52) U.S. Cl.
CPC ...... *G06F 12/0888* (2013.01); *G06F 12/0862* (2013.01); *G06F 2212/603* (2013.01); *G06F 2212/6028* (2013.01)

(58) Field of Classification Search
CPC ........... G06F 12/0888; G06F 2212/603; G06F 12/0862; G06F 2212/6028; G06F 9/30043; G06F 9/4881; G06F 9/3836; G06F 9/3834; G06F 9/5027; G06F 9/3842

See application file for complete search history.

(56) References Cited

U.S. PATENT DOCUMENTS

| 5,619,662 | A | 4/1997 | Steely, Jr. et al. |
| 5,781,752 | A | 7/1998 | Moshovos et al. |
| 2007/0186053 | A1* | 8/2007 | Chaudhry ............. G06F 9/3863 712/E9.05 |
| 2008/0288745 | A1* | 11/2008 | Gonion ................... G06F 9/325 712/205 |
| 2010/0049953 | A1 | 2/2010 | Mylavarapu et al. |
| 2013/0297047 | A1* | 11/2013 | Sullivan ............. G05B 19/0423 700/56 |
| 2014/0181405 | A1 | 6/2014 | Sassone et al. |
| 2015/0293853 | A1* | 10/2015 | Yu ....................... G06F 12/0862 711/137 |
| 2020/0133679 | A1* | 4/2020 | Brandt ................... G06F 9/3844 |

OTHER PUBLICATIONS

International Search Report for PCT application No. PCT/US2021/017943 filed Feb. 12, 2021; dated Jun. 16, 2021. 13 pages.
Speculative Execution Side Channel Mitigations; Revision 3.0; May 2018; 23 Pages.

* cited by examiner

*Primary Examiner* — Jane W Benner
(74) *Attorney, Agent, or Firm* — Young Basile, Hanlon & MacFarlane, P.C.

(57) ABSTRACT

Described is a data cache with prediction hints for a cache hit. The data cache includes a plurality of cache lines, where a cache line includes a data field, a tag field, and a prediction hint field. The prediction hint field is configured to store a prediction hint which directs alternate behavior for a cache hit against the cache line. The prediction hint field is integrated with the tag field or is integrated with a way predictor field.

20 Claims, 6 Drawing Sheets

DATA CACHE WITH PREDICTION HINTS FOR CACHE HITS

CROSS-REFERENCE TO RELATED APPLICATION(S)

This application is a continuation of U.S. patent Ser. No. 16/797,476, filed Feb. 21, 2020, the entire disclosure of which is hereby incorporated by reference.

TECHNICAL FIELD

This disclosure relates to data caches and in particular, data caches having prediction hints for cache hits.

BACKGROUND

Processing systems use parallel processing to increase system performance by executing multiple instructions at the same time. Conventional load instruction execution is to return data as fast as possible for better performance. However, executing certain load instructions as fast as possible can lead to system performance degradation. For example, use of out-of-order processors, branching, jumping, speculative processing, and combinations thereof can lead to execution of instructions prior to the data being ready for use by the instruction. Consequently, the results of the execution have to flushed and the instruction re-executed. This leads to system performance degradation.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
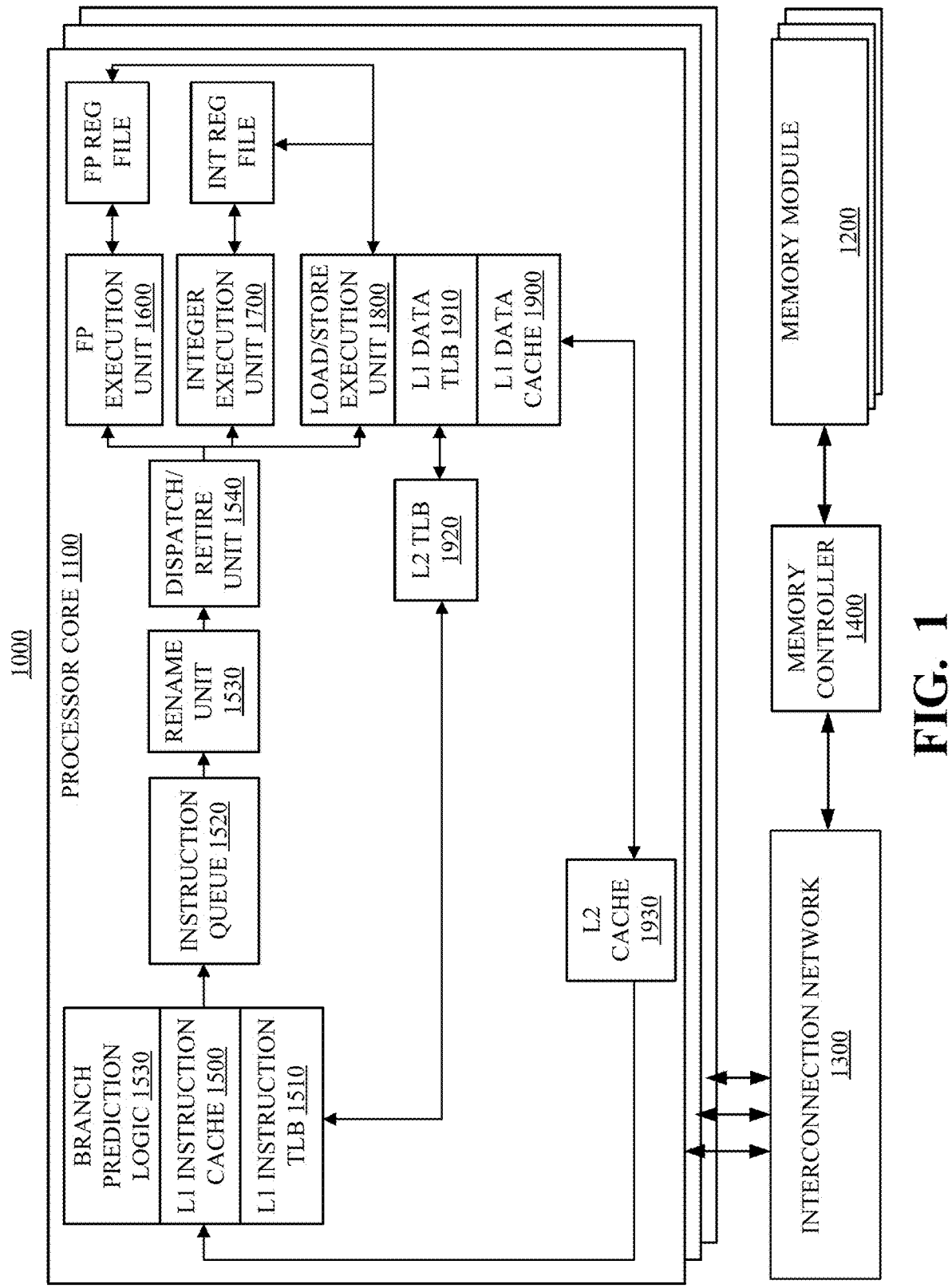
FIG. 1 is a high-level block diagram of an example of a processing system for implementing a data cache with prediction hint in accordance with embodiments of this disclosure.

Disclosed herein are systems and methods for a data cache with prediction hints for a cache hit. A multiprocessor processing system can include multiple processors and a memory. Each of processors can have data caches including a L1 data cache. Data caches are hardware and/or software components that store data so that future requests for that data can be served faster. The data cache can be a data cache which provides prediction hints for cache hits. The prediction hints can slow down or provide alternative behavior with respect to certain instructions to enhance system performance.

Described is a data cache which provides prediction hints for cache hits against the data cache. The data cache includes a plurality of cache lines, where a cache line includes a data field, a tag field, and a prediction hint field. The prediction hint field is configured to store a prediction hint which directs alternate behavior for a cache hit against the cache line. The prediction hint field is integrated with the tag field or is integrated with a way predictor field. The prediction hint can be a disable load data return if unknown Read-After-Write hazard, a speculative store bypass disable, or other alternate behavior.

These and other aspects of the present disclosure are disclosed in the following detailed description, the appended claims, and the accompanying figures.

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

The term "circuit" refers to an arrangement of electronic components (e.g., transistors, resistors, capacitors, and/or inductors) that is structured to implement one or more functions. For example, a circuit may include one or more transistors interconnected to form logic gates that collectively implement a logical function. For example, the processor can be a circuit. For example, the processor can be a circuit.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices and methods shown and described herein.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

It is to be understood that the figures and descriptions of embodiments have been simplified to illustrate elements that are relevant for a clear understanding, while eliminating, for the purpose of clarity, many other elements found in typical processors. Those of ordinary skill in the art may recognize that other elements and/or steps are desirable and/or required in implementing the present disclosure. However, because such elements and steps do not facilitate a better understanding of the present disclosure, a discussion of such elements and steps is not provided herein.

FIG. 1 is a high-level block diagram of an example of a processing system 1000 for implementing a data cache with prediction hints in accordance with embodiments of this disclosure. The processing system 1000 can implement a pipelined architecture. The processing system 1000 can be configured to decode and execute instructions of an instruction set architecture (ISA) (e.g., a RISC-V instruction set). The instructions can execute speculatively and out-of-order in the processing system 1000. The processing system 1000 can be a compute device, a microprocessor, a microcontroller, or an IP core. The processing system 1000 can be implemented as an integrated circuit.

The processing system 1000 includes at least one processor core 1100. The processor core 1100 can be implemented using one or more central processing unit (CPUs). Each processor core 1100 can be connected to one or more memory modules 1200 via an interconnection network 1300 and a memory controller 1400. The one or more memory modules 1200 can be referred to as external memory, main memory, backing store, coherent memory, or backing structure (collectively "backing structure").

Each processor core 1100 can include a L1 instruction cache 1500 which is associated with a L1 translation lookaside buffer (TLB) 1510 for virtual-to-physical address translation. An instruction queue 1520 buffers up instructions fetched from the L1 instruction cache 1500 based on branch prediction 1530 and other fetch pipeline processing. Dequeued instructions are renamed in a rename unit 1530 to avoid false data dependencies and then dispatched by a dispatch/retire unit 1540 to appropriate backend execution units, including for example, a floating point execution unit 1600, an integer execution unit 1700, and a load/store execution unit 1800. The floating point execution unit 1600 can be allocated physical register files, FP register files 1610, and the integer execution unit 1700 can be allocated physical register files, INT register files 1710. The FP register files 1610 and the INT register files 1710 are also connected to the load/store execution unit 1800, which can access a L1 data cache 1900 via a L1 data TLB 1910, which is connected tied to a L2 TLB 1920 which in turn is connected to the L1 instruction TLB 1510. The L1 data cache 1900 is connected to a L2 cache 1930, which is connected to the L1 instruction cache 1500.

The processing system 1000 and each element or component in the processing system 1000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein. As an illustrative example, reference to a data cache includes a data cache controller for operational control of the data cache.

Figure 2:
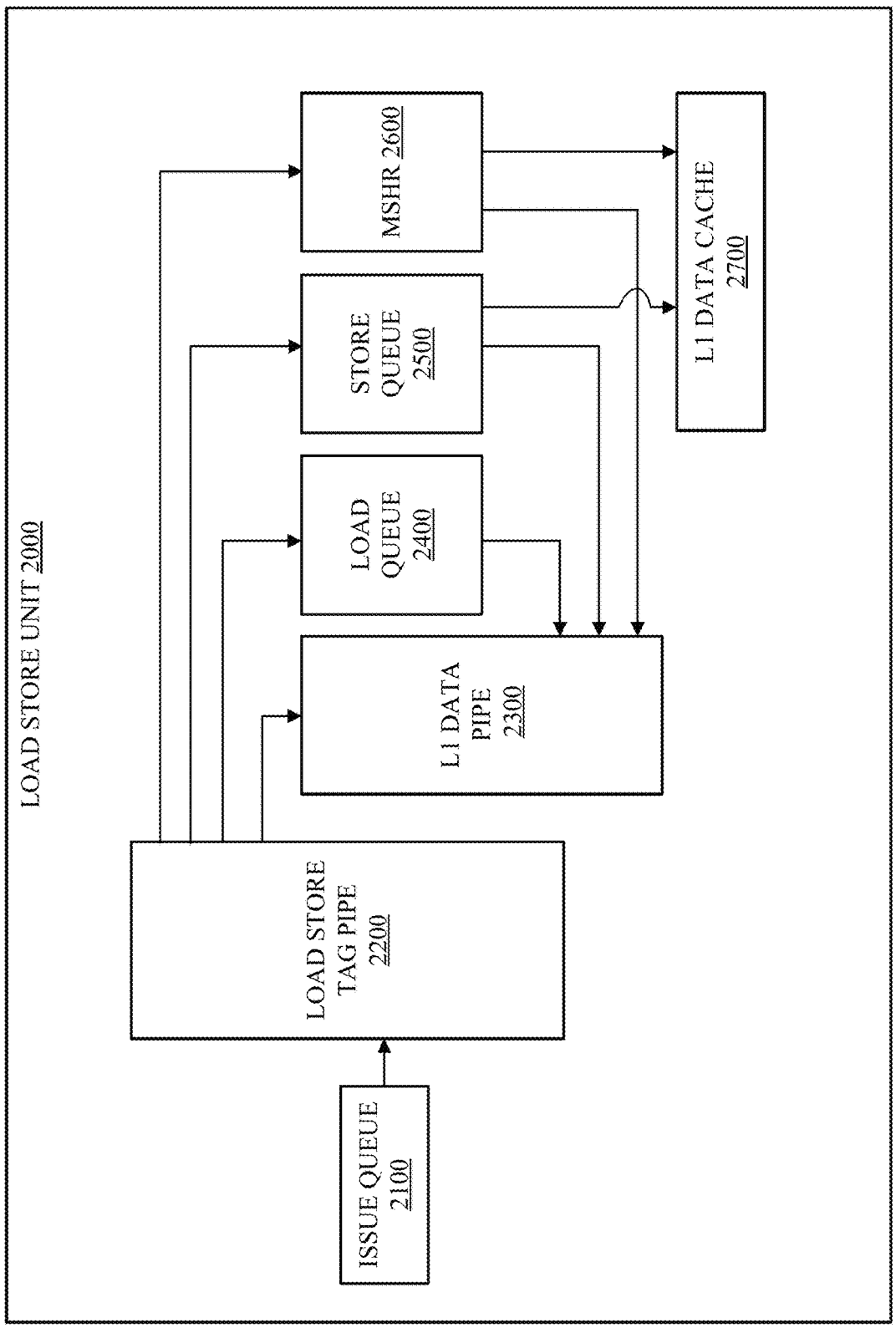
FIG. 2 is a high-level block diagram of an example load store unit of a processing system for implementing a data cache with prediction hint in accordance with embodiments of this disclosure.

FIG. 2 is a high-level block diagram of an example load/store unit 2000 of a processing system for implementing a data cache with prediction hints in accordance with embodiments of this disclosure. The load/store unit 2000 can include an issue queue 2100 which stores instructions dispatched from the dispatch/retire unit 1540 of FIG. 1. The issue queue 2100 can issue instructions into load/store tag pipes 2200, which can then allocate entries in a load/store data pipe 2300, a load queue 2400, a store queue 2500, and a missing status handling registers (MSHRs) 2600. Store instructions buffer data in the store queue 2500 until committed and then gather writes when retiring to a L1 data cache 2700 or the MSHR 2600.

The load/store unit 2000 and each element or component in the load/store unit 2000 is illustrative and can include additional, fewer or different devices, entities, element, components, and the like which can be similarly or differently architected without departing from the scope of the specification and claims herein. Moreover, the illustrated devices, entities, element, and components can perform other functions without departing from the scope of the specification and claims herein.

Figure 3:
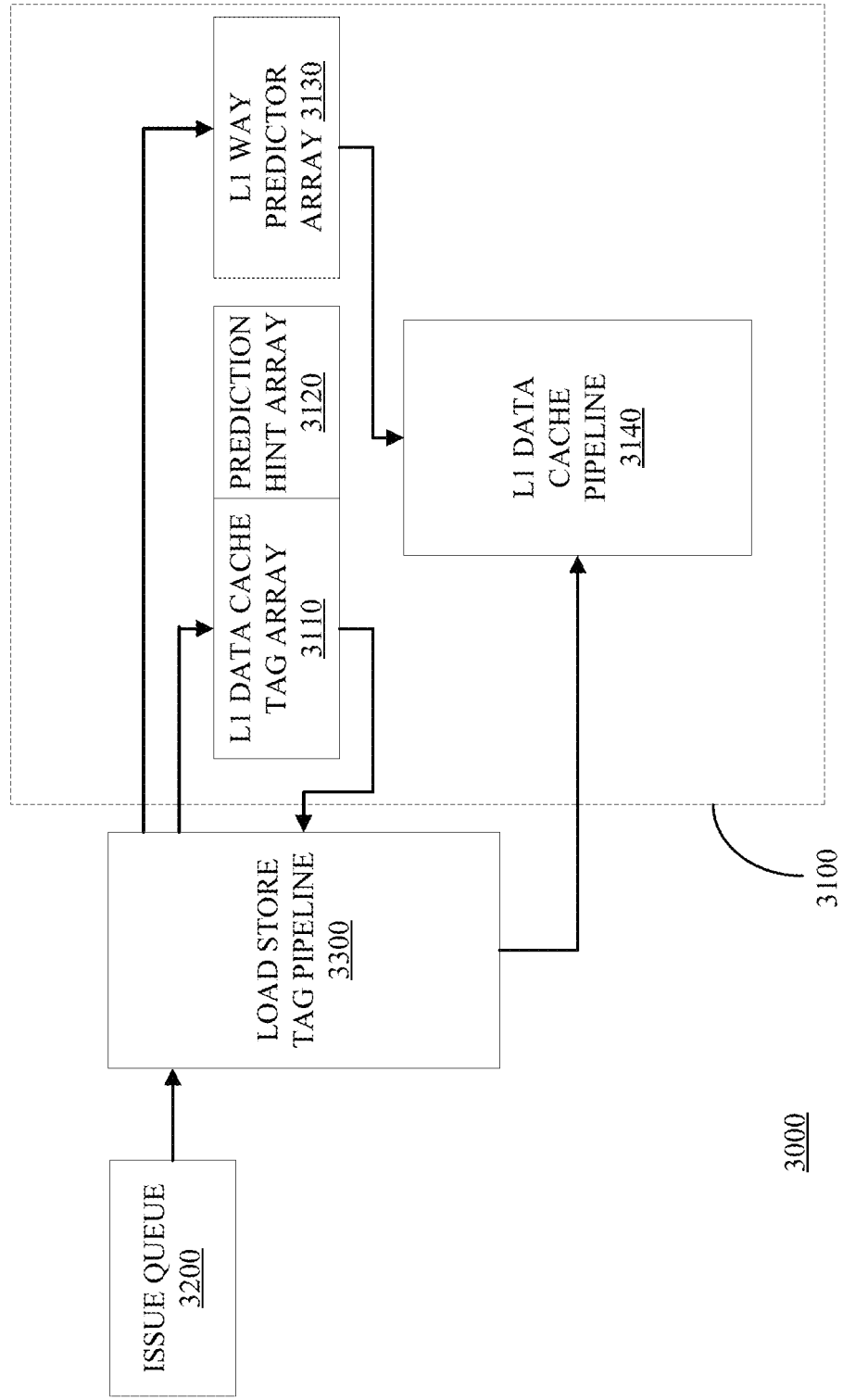
FIG. 3 is a block diagram of an example data cache in accordance with embodiments of this disclosure.

FIG. 3 is a block diagram of an example load/store unit 3000 with a L1 data cache 3100 in accordance with embodiments of this disclosure. The load/store unit 3000 can include an issue queue 3200 which stores instructions dispatched from the dispatch/retire unit 1540 of FIG. 1. The issue queue 3200 can issue instructions into load/store tag pipes 3300, which in processes the data and memory address through the L1 data cache 3100. In particular, the data and memory address is processed through a L1 data cache tag array 3110, a prediction hint array 3120, a L1 way predictor array 3130, and a L1 data cache pipeline 3140. A prediction hint entry or field in the prediction hint array 3120 can be one or more bits, one or more fields, and/or combinations thereof which depend on implementation of a prediction hint logic, which can be any pre-coding hint techniques, partially decoding techniques, re-encoding techniques, table hinting techniques, and the like known to those of skill in the art. In implementations, the prediction hint entry or field is a flag. In implementations, the prediction hint entry or field is an alternative instruction. In implementations, the prediction hint entry or field is a flag and an alternative instruction. In implementations, the prediction hint entry or field is a flag, a problematic instruction, and an alternative instruction. In implementations, the prediction hint entry or field is a problematic instruction and an alternative instruction. In implementations, the prediction hint entry or field is a combination of a flag, a problematic instruction, and/or an alternative instruction. The L1 data cache 3100 can have a plurality of cache lines, where each cache can include at least an entry in the L1 data cache tag array 3110, an entry in the prediction hint array 3120, and an entry in the way predictor array 3130. In implementations, the L1 data cache tag array 3110 and the prediction hint array 3120 are an integrated array.

Operationally, entries in the prediction hint array 3120 can be populated with alternate behavior as opposed to conventional behavior for certain determined or designated instruction types. In implementations, these certain determined or designated instruction types can be based on, for example, repeatedly having to be re-executed, security issues, and like factors. Methods for determining or designating these instruction types are known to those of skill in the art. In implementations, certain of the prediction hint entries in the prediction hint array 3120 are populated. In implementations, all of the prediction hint entries in the prediction hint array 3120 are populated.

Upon a cache line hit against a cache line having a populated prediction hint entry in the prediction hint array 3120, a processor or L1 data cache controller can determine if there is a flag set, an instruction match, an alternative instruction, and/or perform similar prediction hint logic to perform an alternative behavior including for example, but not limited to, disabling a load data return if unknown Read-After-Write hazard or performing a speculative store bypass disable.

Figure 4:
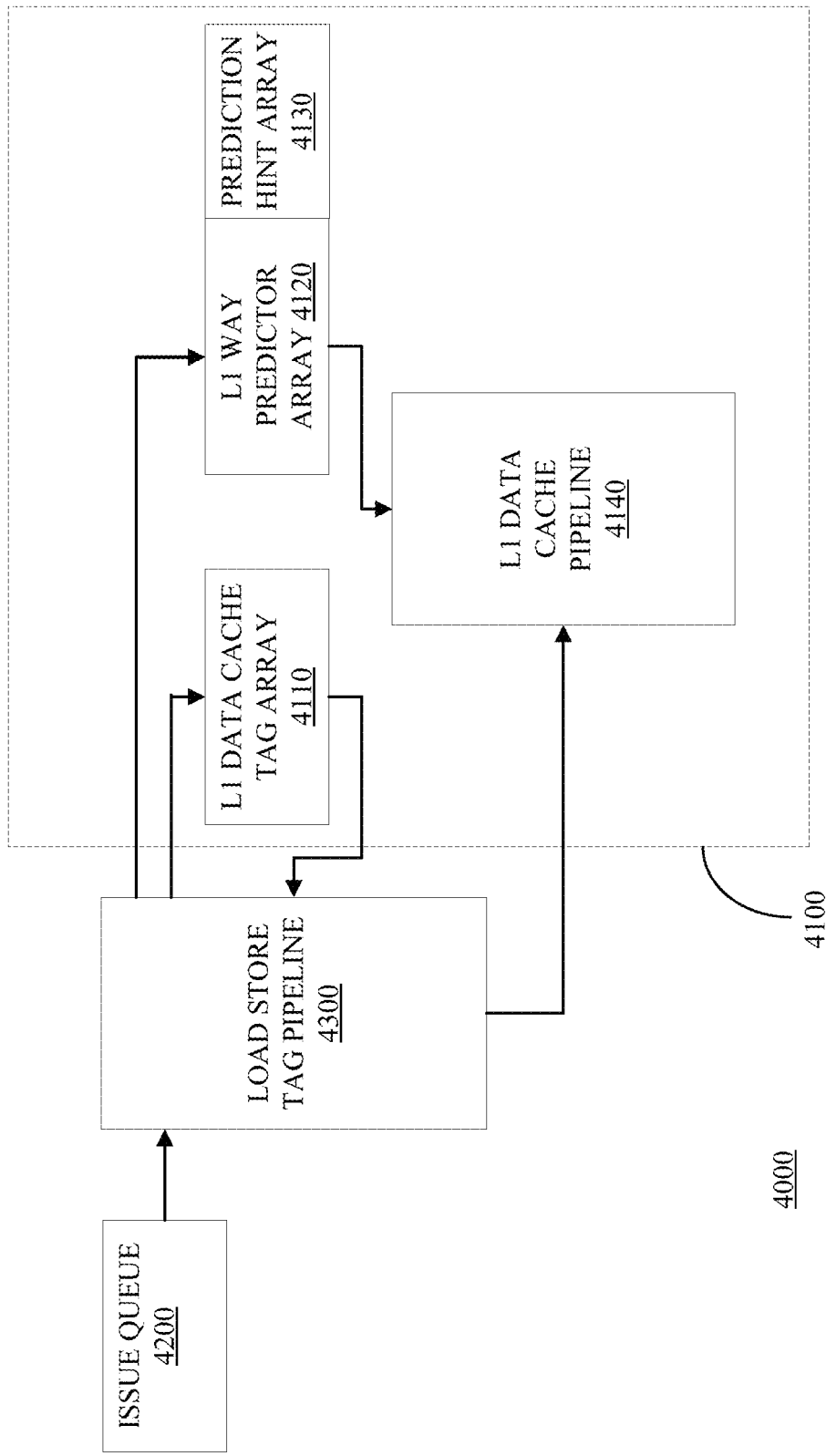
FIG. 4 is another block diagram of an example data cache in accordance with embodiments of this disclosure.

FIG. 4 is a block diagram of an example load/store unit 4000 with a L1 data cache 4100 in accordance with embodiments of this disclosure. The load/store unit 4000 can include an issue queue 4200 which stores instructions dispatched from the dispatch/retire unit 1540 of FIG. 1. The issue queue 4200 can issue instructions into load/store tag pipes 4300, which in processes the data and memory address through the L1 data cache 4100. In particular, the data and memory address is processed through a L1 data cache tag array 4110, a L1 way predictor array 4120, a prediction hint array 4130, and a L1 data cache pipeline 4140. A prediction hint entry or field in the prediction hint array 4130 can be one or more bits, one or more fields, and/or combinations thereof which depend on implementation of a prediction hint logic, which can be any pre-coding hint techniques, partially decoding techniques, re-encoding techniques, table hinting techniques, and the like known to those of skill in the art. In implementations, the prediction hint entry or field is a flag. In implementations, the prediction hint entry or field is an alternative instruction. In implementations, the prediction hint entry or field is a flag and an alternative instruction. In implementations, the prediction hint entry or field is a flag, a problematic instruction, and an alternative instruction. In implementations, the prediction hint entry or field is a problematic instruction and an alternative instruction. In implementations, the prediction hint entry or field is a combination of a flag, a problematic instruction, and/or an alternative instruction. The L1 data cache 4100 can have a plurality of cache lines, where each cache can include at least an entry in the L1 data cache tag array 3110, an entry in the L1 way predictor array 4120, and an entry in the prediction hint array 4130. In implementations, the L1 way predictor array 4120 and the prediction hint array 3120 are an integrated array.

Operationally, the prediction hint array 4130 can be populated with alternate behavior as opposed to conventional behavior for certain determined or designated instruction types. In implementations, these certain determined or designated instruction types can be based on, for example, repeatedly having to be re-executed, security issues, and like factors. Methods for determining or designating these instruction types are known to those of skill in the art. In implementations, certain of the prediction hint entries in the prediction hint array 4130 are populated. In implementations, all of the prediction hint entries in the prediction hint array 4130 are populated.

Upon a cache line hit against a cache line having a populated prediction hint entry in the prediction hint array 4130, a processor or L1 data cache controller can determine if there is a flag set, an instruction match, an alternative instruction, and/or perform similar prediction hint logic to perform an alternative behavior including for example, but not limited to, disabling a load data return if unknown Read-After-Write hazard or performing a speculative store bypass disable.

Figure 5:
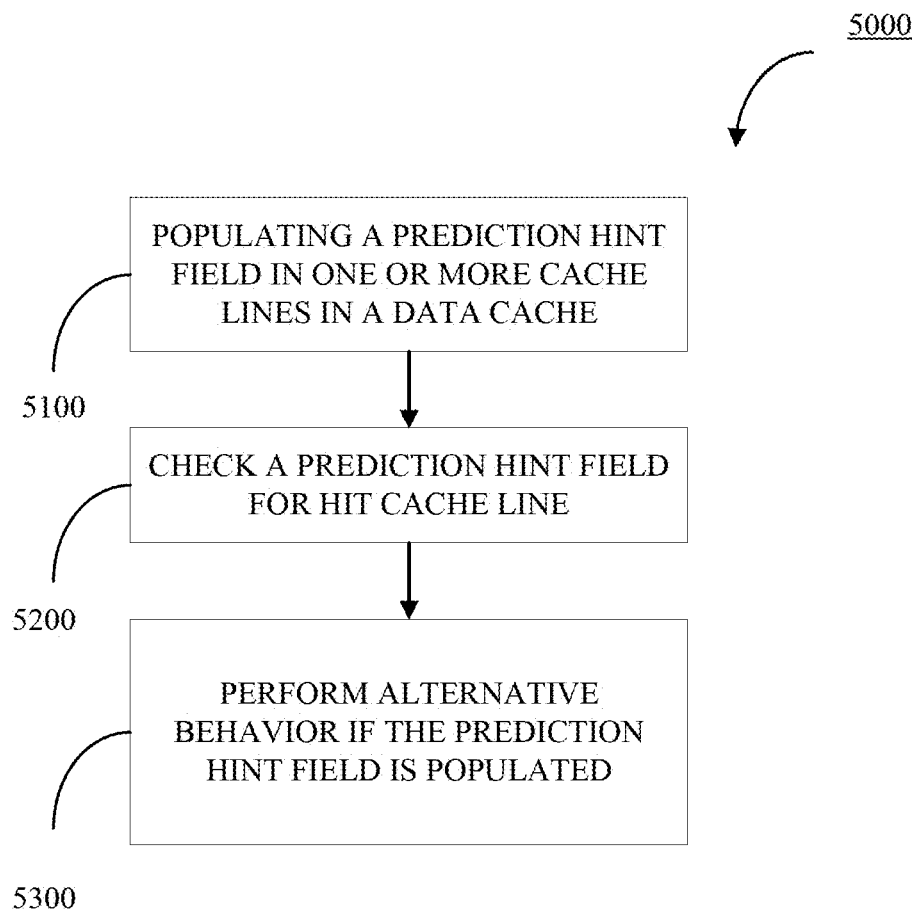
FIG. 5 is a diagram of an example technique for implementing a data cache with prediction hints in accordance with embodiments of this disclosure.

FIG. 5 is a diagram of an example technique 5000 for implementing a data cache with prediction hints in accordance with embodiments of this disclosure. The technique includes: populating 5100 a prediction hint field in one or more cache lines in a data cache; checking 5200 a prediction hint field in a hit cache line; and performing 5300 alternative behavior if the prediction hint field is populated. The technique 5000 can be implemented, for example, in the processing system 1000 of FIG. 1, the load store unit 2000 of FIG. 2, the load store unit 3000 of FIG. 3, the load store unit 4000 of FIG. 4, and like devices and systems.

The technique 5000 includes populating 5100 a prediction hint field in one or more cache lines in a data cache. Prediction hint fields can be populated with alternate behavior as opposed to conventional behavior for certain determined or designated instruction types. In implementations, these certain determined or designated instruction types can be based on, for example, instructions which are repeatedly having to be re-executed, instructions which can cause or result in security issues, and like factors. Methods for determining or designating these instruction types are known to those of skill in the art. In implementations, certain of the prediction hint fields are populated. In implementations, all of the prediction hint fields are populated. In implementations, the prediction hint field is integrated with the data cache tag array. In implementations, the prediction hint field is integrated with the way predictor array.

The technique 5000 includes checking 5200 a prediction hint field in a hit cache line. In the event of a cache line hit in the data cache, the prediction hint field is checked to determine if alternative behavior is available for the instruction associated with the cache line hit. In implementations, the prediction hint field can include a flag, a problematic instruction, an alternative instruction, a pointer, other like hints, and combinations thereof.

The technique 5000 includes performing 5300 alternative behavior if the prediction hint field is populated. In the event that the prediction hint field is populated, the alternative behavior is executed. In implementations, the prediction hint field can include an alternative instruction, a pointer, or like function. In implementations, the alternative behavior can be delaying loading of data for the instruction, performing a different instruction, and the like functions.

Figure 6:
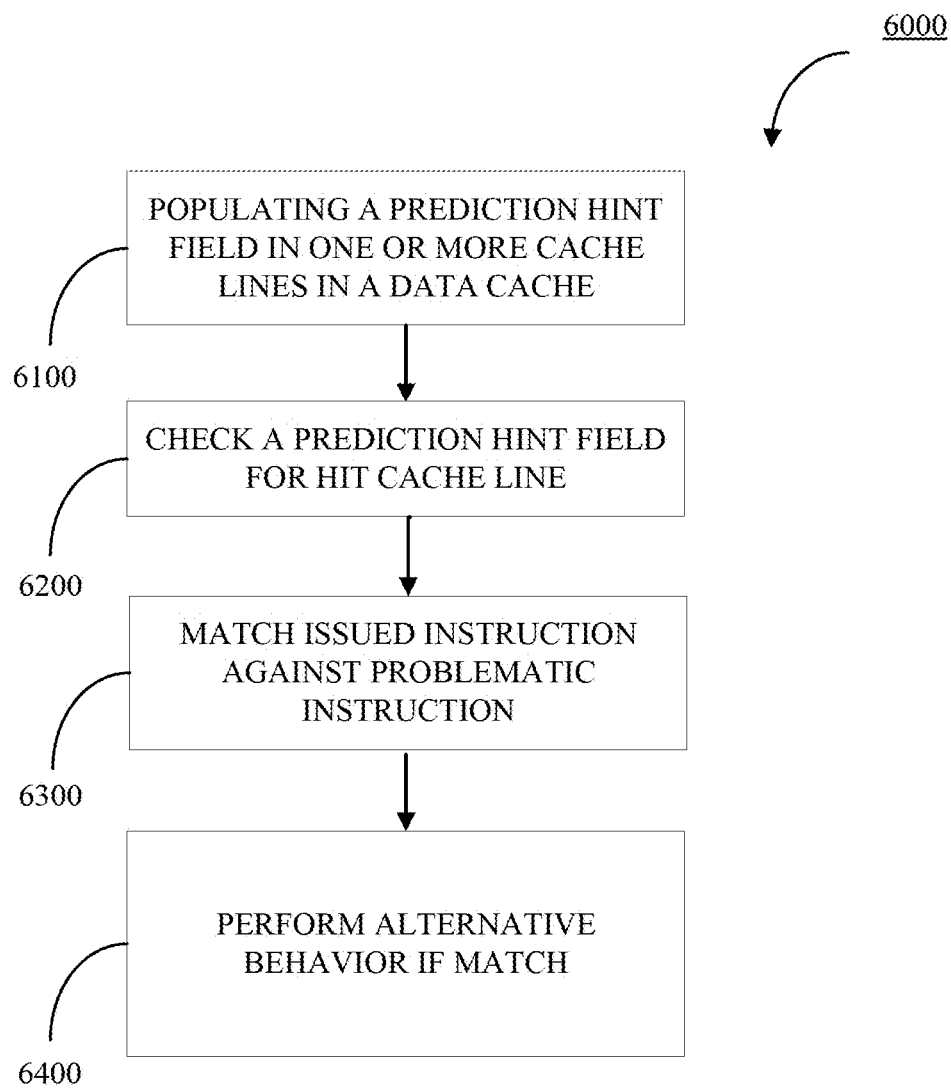
FIG. 6 is another diagram of an example technique for implementing a data cache with prediction hints in accordance with embodiments of this disclosure.

FIG. 6 is a diagram of an example technique 6000 for implementing a data cache with prediction hints in accordance with embodiments of this disclosure. The technique includes: populating 6100 a prediction hint field in one or more cache lines in a data cache; checking 6200 a prediction hint field in a hit cache line; matching 6300 issued instruction against problematic instruction; and performing 6400 alternative behavior if match. The technique 6000 can be implemented, for example, in the processing system 1000 of FIG. 1, the load store unit 2000 of FIG. 2, the load store unit 3000 of FIG. 3, the load store unit 4000 of FIG. 4, and like devices and systems.

The technique 6000 includes populating 6100 a prediction hint field in one or more cache lines in a data cache. Prediction hint fields can be populated with alternate behavior as opposed to conventional behavior for certain determined or designated instruction types. In implementations, these certain determined or designated instruction types can be based on, for example, instructions which are repeatedly having to be re-executed, instructions which can cause or result in security issues, and like factors. Methods for determining or designating these instruction types are known to those of skill in the art. In implementations, certain of the prediction hint fields are populated. In implementations, all of the prediction hint fields are populated. In implementations, the prediction hint field is integrated with the data cache tag array. In implementations, the prediction hint field is integrated with the way predictor array.

The technique 6000 includes checking 6200 a prediction hint field in a hit cache line. In the event of a cache line hit in the data cache, the prediction hint field is checked to determine if alternative behavior is available for the instruction associated with the cache line hit. In implementations, the prediction hint field can include a problematic instruction, an alternative instruction, a pointer, other like hints, and combinations thereof.

The technique 6000 includes matching 6300 issued instruction against problematic instruction. In the event that the prediction hint field is populated, the issued instruction is matched against the populated problematic instruction.

The technique 6000 includes performing 6400 alternative behavior if match. In the event that the issued instruction matches the problematic instruction, the alternative behavior is executed. In implementations, the prediction hint field can include an alternative instruction, a pointer, or like function. In implementations, the alternative behavior can be delaying loading of data for the instruction, performing a different instruction, and the like functions.

In general, data cache includes a plurality of cache lines, at least one cache line including: a data field, a tag field, and a prediction hint field, the prediction hint field configured to store a prediction hint which directs alternate behavior for a cache hit against a cache line with a populated prediction hint field. In implementations, the prediction hint field is integrated with the tag field. In implementations, the data cache further includes a way predictor field, wherein the prediction hint field is integrated with the way predictor field. In implementations, the data cache is a L1 data cache. In implementations, the at least one cache line is the plurality of cache lines. In implementations, the at least one cache line is a subset of the plurality of cache lines. In implementations, the prediction hint is a disable load data return if unknown Read-After-Write hazard. In implementations, the prediction hint is a speculative store bypass disable. In implementations, certain cache lines have populated prediction hints.

In general, a data cache includes a data array, a tag array, and a prediction hint field, the prediction hint field configured to store a prediction hint which directs alternate behavior for a cache hit against a cache line, wherein each cache line is associated with an entry in the data array and the tag array. In implementations, each entry of the tag array has an integrated prediction hint field. In implementations, certain cache lines have stored prediction hints. In implementations, the data cache further includes a way predictor array, wherein each entry in the way predictor array has an integrated prediction hint field. In implementations, the prediction hint is a disable load data return if unknown Read-After-Write hazard. In implementations, the prediction hint is a speculative store bypass disable. In implementations, certain cache lines have stored prediction hints.

In general, a method for providing prediction hints using a data cache includes storing prediction hints in a prediction hint element for certain cache lines in one of a tag array or a way predictor of the data cache, reading a prediction hint from the prediction hint element in the event of a cache line hit against one of the certain cache lines, and performing alternate instruction behavior as defined by the prediction hint. In implementations, the prediction hint is a disable load data return if unknown Read-After-Write hazard. In implementations, the prediction hint is a speculative store bypass disable. In implementations, the method further includes matching an issued instruction against a problematic instruction stored in the prediction hint element.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more computer readable mediums having computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A data cache comprising:
    a plurality of cache lines, at least one cache line comprising:
        a data field;
        a tag field; and
        a prediction hint field, wherein the prediction hint field stores an alternate instruction behavior and an instruction of a designated type, wherein the alternate instruction behavior is performed responsive to a determination that an issued instruction matches the instruction.

2. The data cache of claim 1, wherein the prediction hint field is integrated with the tag field.

3. The data cache of claim 1, further comprising:
    a way predictor field, wherein the prediction hint field is integrated with the way predictor field.

4. The data cache of claim 1, wherein the data cache is a L1 data cache.

5. The data cache of claim 1, wherein the designated type is an instruction which is repeatedly being re-executed.

6. The data cache of claim 1, wherein the at least one cache line is more than one cache line of the plurality of cache lines.

7. The data cache of claim 1, wherein the alternate instruction behavior is a disable load data return in response to Read-After-Write hazard.

8. The data cache of claim 1, wherein the alternate instruction behavior is a speculative store bypass disable.

9. The data cache of claim 1, wherein for at least another cache line, a prediction hint field is unpopulated.

10. A data cache comprising:
    a data array;
    a tag array; and
    a prediction hint field array, wherein at least one entry in the prediction hint field array stores an alternate instruction behavior and an instruction of a designated type, wherein the alternate instruction behavior is performed responsive to a determination that an issued instruction matches the instruction.

11. The data cache of claim 10, wherein each entry of the tag array has an integrated prediction hint field.

12. The data cache of claim 11, wherein certain entries in the prediction hint field array are unpopulated.

13. The data cache of claim 10, further comprising:
    a way predictor array, wherein each entry in the way predictor array has an integrated prediction hint field.

14. The data cache of claim 10, wherein the alternate instruction behavior is a disable load data return in response to Read-After-Write hazard.

15. The data cache of claim 10, wherein the alternate instruction behavior is a speculative store bypass disable.

16. The data cache of claim 10, wherein the alternate instruction behavior is delaying loading of data for the issued instruction.

17. A method for providing prediction hints using a data cache, the method comprising:
    storing alternate instruction behavior and an instruction of a designated type in a prediction hint element for at least one cache line in a defined field or array of the data cache;
    comparing an issued instruction to the instruction stored in the prediction hint element; and
    performing the alternate instruction behavior responsive to a determination that an issued instruction matches the instruction.

18. The method of claim 17, wherein the alternate instruction behavior is a disable load data return in response to Read-After-Write hazard.

19. The method of claim 18, wherein the alternate instruction behavior is a speculative store bypass disable.

20. The method of claim 19, wherein the designated type is an instruction which is repeatedly being re-executed.

* * * * *